United States Patent [19]
Peterson

[11] Patent Number: 6,164,783
[45] Date of Patent: Dec. 26, 2000

[54] DIMMING MIRROR ASSEMBLY

[75] Inventor: Kenneth C. Peterson, Comstock, Mich.

[73] Assignee: Magna Mirror Systems Inc., Kentwood, Mich.

[21] Appl. No.: 09/250,175

[22] Filed: Feb. 16, 1999

Related U.S. Application Data

[60] Provisional application No. 60/074,804, Feb. 17, 1998.

[51] Int. Cl.⁷ .................. G02B 5/08; G02B 17/00
[52] U.S. Cl. .................. 359/603; 359/608; 359/614
[58] Field of Search ................. 359/601, 602, 359/603, 608, 614

[56] References Cited

U.S. PATENT DOCUMENTS

| | | |
|---|---|---|
| 3,000,262 | 9/1961 | Rabinow et al. . |
| 3,174,398 | 3/1965 | Brauner ................. 359/614 |
| 3,198,070 | 8/1965 | Platzer, Jr. et al. ......... 359/603 |
| 3,233,515 | 2/1966 | Platzer, Jr. et al. ......... 359/228 |
| 3,259,017 | 7/1966 | Faulhaber . |
| 3,470,049 | 9/1969 | Reusch . |
| 3,552,825 | 1/1971 | Wellbrock . |
| 3,567,312 | 3/1971 | Platzer, Jr. . |
| 3,748,025 | 7/1973 | Van Patten, Jr. ........... 359/605 |
| 4,054,374 | 10/1977 | Craig . |
| 4,603,946 | 8/1986 | Kato et al. . |
| 4,623,222 | 11/1986 | Itoh et al. . |
| 4,726,656 | 2/1988 | Schofield et al. ........... 359/603 |
| 5,231,530 | 7/1993 | Yen ..................... 359/228 |
| 5,520,434 | 5/1996 | Paetz et al. .............. 296/211 |

FOREIGN PATENT DOCUMENTS

| | | |
|---|---|---|
| 733744 | 5/1966 | Canada . |
| 400 589 A3 | 12/1990 | European Pat. Off. . |
| 62-99721 | 5/1987 | Japan . |
| 960539 | 6/1964 | United Kingdom . |
| 2 191 602 | 12/1987 | United Kingdom . |

*Primary Examiner*—Cassandra Spyrou
*Assistant Examiner*—Mark A. Robinson
*Attorney, Agent, or Firm*—Pillsbury Madison & Sutro LLP

[57] ABSTRACT

A dimming mirror assembly has a housing, a reflective member, a transparent member, a light reducing medium, and an actuating mechanism for introducing and evacuating the light reducing medium disposed in a gap between the transparent member and the reflective medium. The reflective member and the transparent member are carried by the housing. At least one of the transparent member and the reflective member is moveable relative to the other. The amount of light transmitted to and reflected from the reflective member is a function of the volume of light reducing medium therebetween, the volume being variable by effecting relative movement between the reflective and transparent members. The controlling mechanism may include an actuating mechanism for effecting the relative movement between the reflective and transparent members.

33 Claims, 5 Drawing Sheets

DIMMING MIRROR ASSEMBLY

This application claims the Benefit of U.S. Provisional No. 60/074,804 filed Feb. 17, 1998.

FIELD OF THE INVENTION

The present invention relates to a dimming mirror assembly having an improved mechanism for effecting a change in the amount by which light reflected from the mirror is dimmed.

BACKGROUND OF THE INVENTION

A significant problem with night-time driving is that the rear view mirrors of the vehicle can reflect the light from headlights of a trailing vehicle into the eyes of the driver, thereby impairing the vision of the driver. A conventional solution to this problem, used primarily with interior, center-mounted rear view mirrors, is to employ a prism mirror with a switch lever on the mirror housing. The switch can be moved between a daytime position, providing direct, normal intensity reflection from the mirror surface, and a night time position providing a reduced intensity reflection. With the intensity of light reflected to the driver, the intensity of reflected headlights from trailing vehicles is insufficient to impair the driver's vision.

Another method proposed for reducing the intensity of light reflected from a rear view mirror is to employ an assembly wherein a reflective member and a transparent member are mounted in a sealed housing with a gap therebetween. A liquid light absorbing medium is disposed between the reflective and transparent members, and this medium, by absorbing a portion of the light transmitted to the reflective member and a portion of the light reflected by the reflective member, reduces the intensity of the light ultimately reflected to the driver. The amount of light reduction depends on the amount of light reducing medium between the transparent and reflective members. The transparent and reflective members may be movable with respect to each other so as to vary the size of the gap therebetween, thereby varying the amount of light reducing medium between the members and the amount of light intensity reduction achieved. That is, when the size of the gap is reduce, light reducing medium is forced out of the gap, and when the gap is enlarged, light reducing medium is drawn into the gap.

Different mechanisms for effecting relative movement between the transparent and reflective members have been proposed in the patent literature. For example, U.S. Pat. No. 3,198,070 discloses a solenoid mechanism and an electromagnet mechanism for moving a mirror within a housing to vary a gap between the mirror and a glass front of the housing. U.S. Pat. No. 3,567,312 discloses a day-night mirror actuation mechanism in which a chamber between a diaphragm and a glass is filled with fluid light controlling medium, and a pressure chamber is disposed within the housing. A spring within the chamber biases the diaphragm, to which the mirror is attached, into a spaced apart position with respect to the glass. When the pressure chamber is evacuated, the spring is compressed and the diaphragm moves forward to press the mirror into the glass. U.S. Pat. No. 3,233,515 discloses a rear view mirror in which a mirror controlling diaphragm is spring biased and is attached to a cable which extends to a driver-accessible control position and is used for manually moving the mirror against the bias of the spring.

A number of references disclose mechanisms whereby a pump is used to force a light attenuating medium between the glass and the mirror. For example, U.S. Pat. No. 3,259,017 discloses a system in which a pump mechanism is used to selectively force a light dimming fluid between the mirror and the glass. U.S. Pat. No. 4,054,374 discloses a mirror attached to a flexible diaphragm. A fluid can be pumped between the mirror and the lens to form a gap therebetween, the mirror being movable on the flexible diaphragm. U.S. Pat. No. 4,726,656 discloses a mirror in which a light attenuating fluid may be forced between the reflector plate and a window plate. A number of different pump mechanisms are disclosed.

The mechanisms described in the forgoing patents are costly, technologically difficult to employ, or otherwise not practical. For these reasons, these mechanisms have met with little, if any, commercial acceptance. Accordingly, a commercial need exists for a dimming mirror assembly that employs simpler and less expensive versions of the mechanisms described in the above-mentioned patents or simpler and less expensive alternatives to the above-mentioned mechanisms.

SUMMARY OF THE INVENTION

It is an object of the present invention to provide a dimming mirror assembly that is simpler and less expensive to manufacture than conventional dimming mirror assemblies that have been proposed or are presently available.

In accordance with one aspect of the present invention, a dimming mirror assembly for a vehicle is provided which comprises a housing constructed and arranged to be mounted on a vehicle in a position to be viewed by the driver. A reflective member and a cooperating transparent member together define a mirror within the housing for providing a driver viewing the housing a rear view with respect to the vehicle. Mounting structure mounts the reflective and transparent members in the housing in juxtaposition with respect to one another for relative movement toward and away from one another to define a gap of variable size between the reflective and transparent members. A light reducing medium is disposed within the gap and is constructed and arranged to reduce the intensity of light in the rear view reflected by the reflective member through the transparent member to the driver. The amount of light intensity reduction is in direct relation to the amount of the light reducing medium disposed between the reflective and transparent members, which, in turn, is in direct relation to the size of the gap.

An actuating mechanism is operatively associated with the reflective and transparent members and is constructed and arranged to effect relative movement between the reflective and transparent members. The actuating mechanism includes a deformable member having a portion thereof coupled to either the transparent member or the reflective member and another portion thereof fixed with respect to the housing. The deformable member is constructed and arranged to deform upon application of voltage thereto. Thus, the portion of the deformable member coupled to either the transparent member or the reflective member moves with respect to the portion of the deformable member fixed with respect to the housing as the deformable member changes from an undeformed condition to a deformed condition. The deformable member thus imparts a relative movement between the reflective and transparent members to vary the size of the gap therebetween and thereby vary the amount of light reducing medium disposed between the reflective and transparent members and the amount of light intensity reduction of the light reflected through the transparent member to the driver.

A voltage regulating mechanism is constructed and arranged to regulate voltage applied to the deformable member of the actuating mechanism in response to an external input. The voltage regulating member thus regulates deformation of the deformable member to thereby regulate the size of the gap between the reflective and transparent members and the amount of light intensity reduction of the light reflected through the transparent member to the driver responsive to the external input.

In accordance with another aspect of the invention, there is provided a dimming mirror assembly for a vehicle having a housing constructed and arranged to be mounted on a vehicle. A reflective member and a cooperating transparent member together define a mirror within the housing. The reflective and transparent members are mounted in the housing in juxtaposition with respect to one another for relative movement towards and away from one another to define a gap of variable size between the reflective and transparent members. A light reducing medium communicates with the gap. An actuating mechanism includes a deformable member having a portion thereof coupled to at least one of the transparent and reflective members and another portion thereof fixed with respect to the housing. The deformable member deforms upon application of voltage thereto to effect the relative motion and vary the size of the gap and responsively vary an amount of light reducing medium disposed between the reflective and transparent members. A voltage regulating mechanism is connected to the actuating mechanism for regulating the voltage applied to the deformable member thereby regulating an amount of light reflected by the reflective member.

DETAILED DESCRIPTION OF THE PREFERRED EMBODIMENTS

Figure 1:
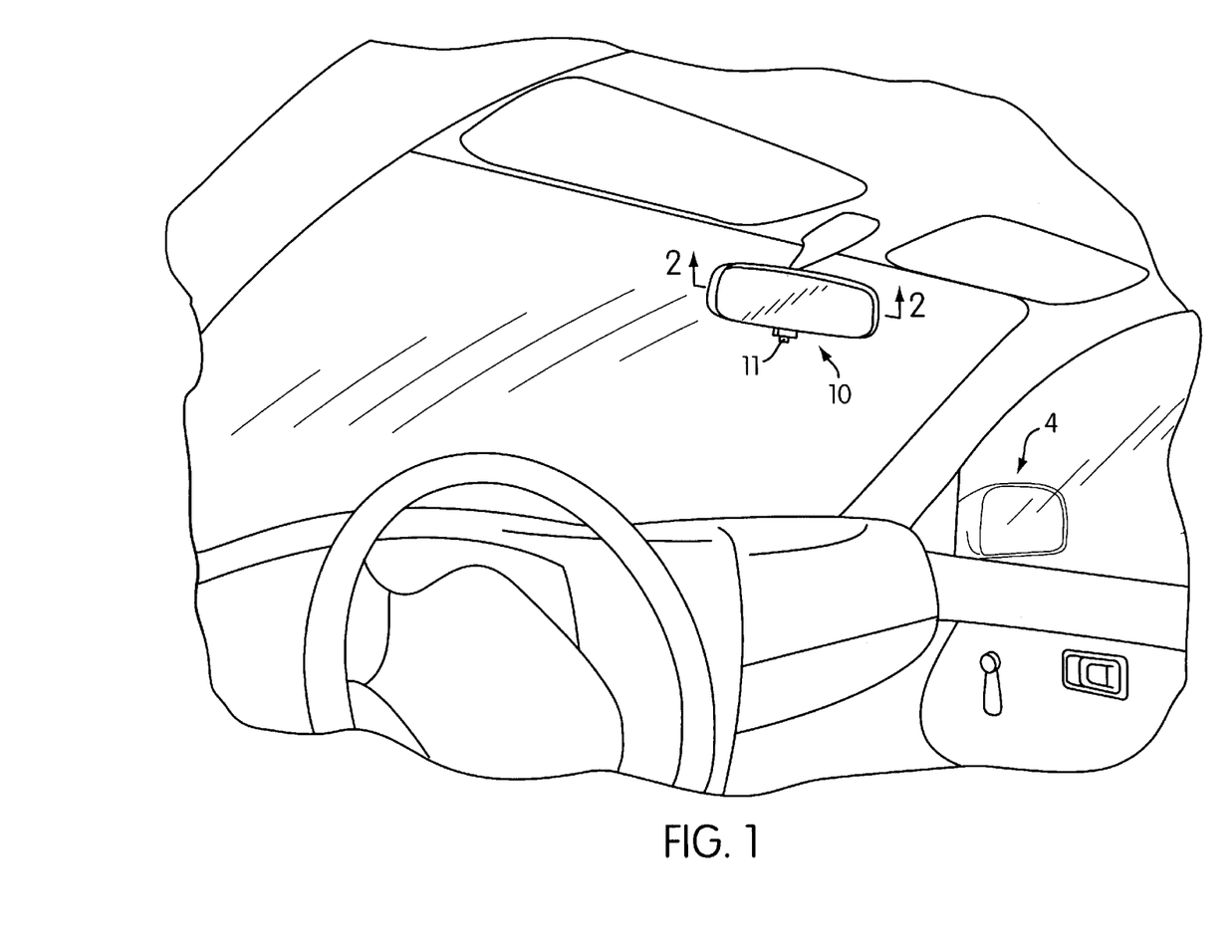
FIG. 1 is a perspective view of a dimming mirror assembly of the present invention shown mounted as a central rear-view mirror within a motor vehicle.

The present invention relates to a dimming mirror assembly, indicated generally at 10 in FIG. 1. In FIG. 1, the dimming mirror assembly 10 is mounted as a central rear-view mirror inside a motor vehicle, where it has a preferred application. The dimming mirror assembly of the present invention can also be incorporated into an exterior, side mounted mirror 4.

Figure 2:
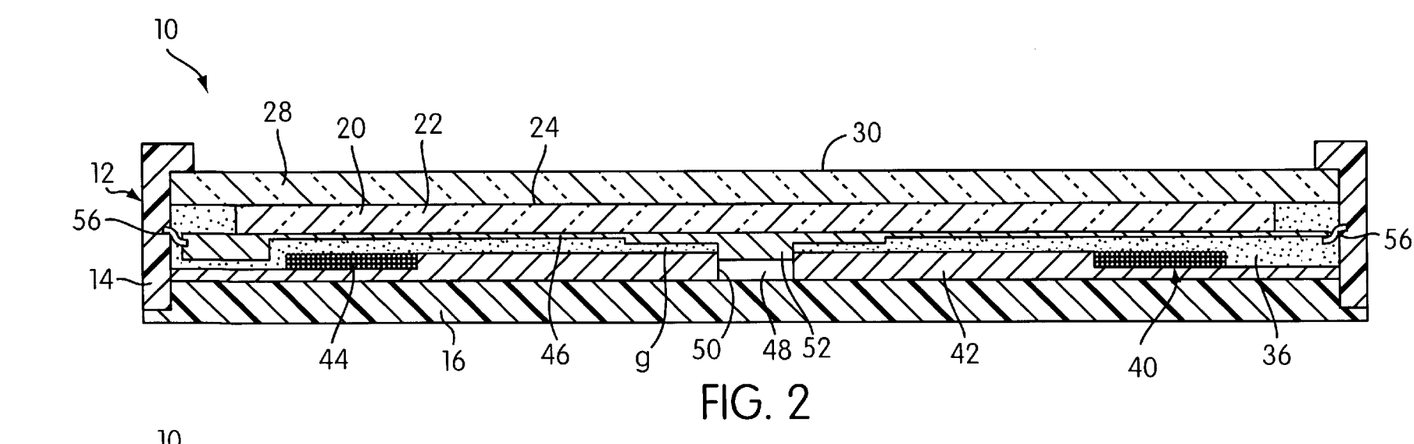
FIG. 2 is a schematic cross-sectional view of the dimming mirror assembly of the present invention taken through the line 2—2 in FIG. 1 and showing the dimming mirror assembly in a non-dimming condition.

FIG. 2 is a longitudinal sectional view taken through the line 2—2 in FIG. 1. As shown in FIG. 2, the mirror assembly 10 includes a housing 12, which is preferably made from a plastic or metal material and is constructed and arranged to be mounted on the vehicle in a position to be viewed by the vehicle's driver. In the embodiment shown, the housing 12 comprises an annular or peripheral wall 14, and a back wall 16. These portions 14 and 16 of the housing 12 may be separate units adhered or otherwise fixed to one another, or may constitute an integrally molded or otherwise formed structure. The housing may be of any desired shape corresponding to the desired shape of the mirror, such as the conventional general rectangular shape for the interior, central rearview mirror.

A reflective member 20 is carried within the housing 12. Preferably, the reflective member 20 comprises mirror glass 22 having a reflective surface coating 24. It can be appreciated, however, that the reflective member 20 can be of any known type, such as a highly reflective metallic structure.

A transparent member 28 is also carried by the housing 12 and cooperates with the reflective member 20 to define a mirror by permitting incoming light to pass therethrough to be incident upon the reflective member 20, and particularly in the preferred embodiment, upon the reflective coating 24 of the mirror glass 22. The transparent member 28 also permits light reflected by the reflective member 20 to pass therethrough and out of the mirror assembly 10. Mounting structure mounts the reflective member 20 and the transparent member 28 within the housing 12 in juxtaposition with respect to each other with a gap G (see FIG. 3) defined therebetween. The mounting structure permits relative movement between the reflective member 20 and the transparent member 28 toward and away from each other to vary the gap between the members.

While the transparent member is preferably clear glass, it is contemplated that it can also comprise clear plastic, or a slightly tinted material. In addition, as will be described in greater detail later, it may be desirable to provide anti-reflective coating on the exterior surface 30 of the transparent member. In the embodiment shown, the transparent member 28 cooperates with housing 12 to define a sealed enclosure which is constructed and arranged to contain a fluid.

A light reducing medium 36 is disposed within the housing 12. The medium 36 is preferably in the form of a liquid and can be disposed between the reflective member 20 and the transparent member 28 (e.g., see FIG. 3) to reduce the amount of incoming light transmitted from the transparent member 28 to the reflective member 20. In addition, the light-reducing medium 36 reduces the amount of reflected light transmitted from the reflective member 20 to the transparent member 28 to be transmitted out of the mirror assembly 10. The amount of incoming light that is reflected back out of the mirror is a function of the amount (or thickness, distance-wise) of light reducing medium 36 disposed between the reflective member 20 and the transparent member 28.

As a preferred embodiment, the light reducing medium 36 is simply an antifreeze fluid, such as that which might be used for windshield wiper fluid. The anti-freeze fluid can also be the type used in a radiator for motor vehicle, although non-toxic fluids are more preferred. The fluids may comprise polyethyleneglycol, polypropyleneglycol, or butanal. In such an embodiment, an indigo dye may be added to the fluid to give it a bluish tint which acts as a filter that transmits only blue wavelength light therethrough. It can also be appreciated that the greater the distance between the transparent member 28 and the reflective surface of the reflective member 20, will result in a greater amount of light reducing medium between the transparent member 28 and the reflective member 20 and thus a greater amount of light being absorbed or dissipated by the light reducing medium 36, such that less light will be reflected out of the mirror assembly 10.

It should be appreciated that the light reducing medium 36 can be any medium that will reduce the transmissivity of light passing therethrough, and which can be displaced from between the transparent member 28 and reflective member 20, or can be otherwise altered to reduce the light reducing character thereof. As another example, relatively fine black particulate matter can be held in suspension within a fluid or gel that can be positioned between the reflective member 20 and transparent member 28. Such particulate matter is capable of absorbing or dissipating light rather than permitting it to transmit therethrough.

As will be appreciated, the light reducing medium 36 can be displaced from between the transparent member 28 and reflective member 20 so that any dimming effect is avoided. In particular, a controlling mechanism 40 is constructed and arranged to control the amount of light reducing medium 36 disposed between the reflective member 20 and transparent member 28 to thereby control the amount of incoming light that will be reflected back out of the mirror assembly 10. In the embodiment illustrated in FIGS. 2 and 3, the controlling mechanism 40 is in the form of a solenoid actuating mechanism. In particular, the solenoid mechanism comprises a solenoid backing 42 fixed to the housing back wall 16. The controlling mechanism 40 further includes a coiling winding 44 for carrying a current therethrough and which is secured to the solenoid backing 42. The controlling mechanism 40 further includes a solenoid front 46, which is fixed by adhesive or the like to the backside of the reflective member 20. The solenoid front 46 is made from a magnetic or ferric material. The solenoid backing 42 has a central recess 48 defined surrounding surfaces 50. The solenoid front 46 has a central projecting portion 52 which is received within the recess 48 and disposed in sliding surface contact with surfaces 50.

When the mirror assembly 10 is in the configuration illustrated in FIG. 2, where there is minimal gap between the transparent member 28 and the reflective member 20, there is maximum reflection of incoming light back out through the transparent member 28. In this configuration, there is a predetermined gap g between the solenoid front 46 and the solenoid backing 42. Although FIG. 2 shows a configuration in which there is no gap between the transparent member 28 and the reflective member 20, in the preferred embodiment of the present invention, the transparent member 28 and the reflective member 20 are never actually placed in contact with one another, because, due to fluid pressure between the contacting members, a great amount of force would be required to separate the members. Preferably, the gap G between the transparent member 28 and the reflective member 20 is varied within a range of 0.3–2.0 mm.

Biasing structures, such as a plurality of leaf springs 56, are fixed to the housing 12 and bias the solenoid front 46 and reflective member 20 fixed thereto in a direction towards the transparent member 28, so as to provide an arrangement wherein the reflective member 20 is normally biased into a position of minimized dimming effect.

Figure 3:
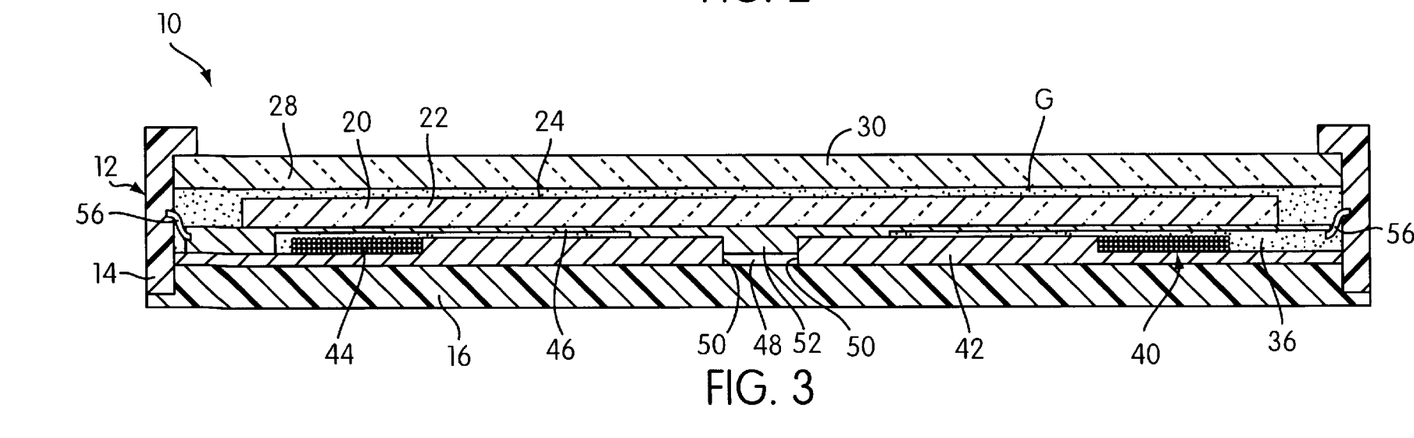
FIG. 3 is a schematic cross- sectional view similar to that of FIG. 2, but showing the dimming mirror assembly in a dimming condition.

When the user intends to dim the reflectivity of the mirror assembly 10, the user activates a manually operable switch 11 connected to a power source (not shown) to apply a current through the coil winding 44. The current through the coil winding 44 applies an attractive magnetic force to the solenoid front 46 to move the solenoid front 46 and reflective member 20 attached thereto in a direction away from the transparent member 28 against the bias of the leaf springs 56. As a result, the light reducing medium 36 is displaced from between the solenoid front 46 and the solenoid backing 42 and is moved to a gap G between the reflective member 20 and the transparent member 28. The gap G between the transparent member 28 and reflective member 20 in accordance with this embodiment will be the same distance as the gap g which previously existed between the solenoid front 46 and solenoid backing 42. The distance of this gap G in accordance with this embodiment controls the amount of light reducing medium disposed between the reflective member 20 and a transparent member 28. Where the gap in nonexistent, the amount of light reducing medium between the reflective member and the transparent member is negligible to none. Where there is a minimum or nonexistent gap between the transparent member 28 and the reflective member 20, there is maximum reflectivity of the mirror assembly 10. When the gap G between the transparent member 28 and the, reflective member 20 is at a maximum, there is minimum transmissivity through the mirror assembly, and thus minimum reflection of light.

When the current through the coil winding 44 is terminated, the leaf springs 56 are able to bias the solenoid front 46 and reflective member 20 back towards the transparent member 28 to allow for maximum transmissivity and reflection of the mirror assembly 10.

Rather than powering the coil winding 44 by use of a manually actuated switch, the present invention contemplates that current to the coil winding 44 can be provided automatically by use of a sensor switch which detects the conditions for dimming. More specifically, it is known in art to provide automatic dimming control based upon relative brightness in a direction forwardly of a central rear view mirror versus the brightness rearwardly of the central rear view mirror. Thus, for example, when the sensor detects that there is greater than a threshold difference in the amount of brightness coming from the rear of the vehicle in comparison with the brightness forwardly of the vehicle (e.g., as caused by the headlights of a trailing vehicle), the sensor will send a signal to the coil winding 44 to actuate the dimming effect. If a sensor switch is employed to control dimming, a manually actuated override switch may be provided in conjunction with the sensor to permit the sensor to be overridden.

While operation of the forgoing switch mechanisms has been described in the context of controlling current to the coil winding 44 of the embodiment of the present invention shown in FIGS. 2 and 3, it will be readily appreciated that the switching mechanisms described herein are operable with any of the powered dimming assembly embodiments described in this specification.

As an alternative to the solenoid assembly of this embodiment, the controlling mechanism 40 may comprise any mechanical or electromechanical controlling mechanism which is capable of controlling the amount of light reducing medium disposed between the reflective member 20 and the transparent member 28. For example, the controlling mechanism may simply comprise a bi-directional motor (not shown) having a screw-thread shaft that moves the reflective member 20 towards and away from the transparent member 28.

Figure 5:
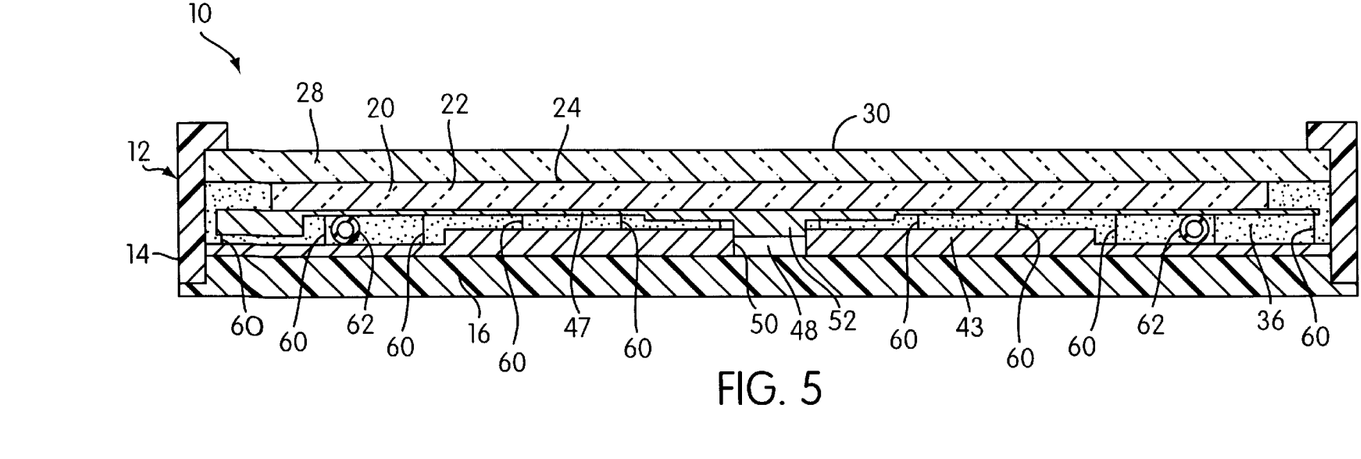
FIG. 5 is a schematic cross-sectional view similar to that in FIG. 2, but illustrating a third embodiment of the present invention.

Another contemplated alternative for the controlling mechanism is shown in FIG. 5. An actuating mechanism includes one or more a deformable members constructed and arranged to effect relative movement between the transparent member 28 and the reflective member 20. As illustrated in FIG. 5, the deformable members of this embodiment comprise an array of shape memory alloy (SMA) wires 60 attached between the mirror glass 22 and the back wall 16. Here, the solenoid front is replaced by a simple mirror backing 47 and the solenoid backing is replaced by a housing reinforcement 43. When current is applied through the SMA wires 60, the wires 60 are deformed (i.e., they are shortened) to move the reflective member 20 towards the back wall 16 as each wire 60 changes from an undeformed condition to a deformed, or shortened, condition. As also illustrated in FIG. 5, the leaf springs 56 can be replaced by an air-filled doughnut O-ring 62, or other biasing structure, to bias the reflective member 20 towards transparent member 28. When the current through the SMA wires is terminated, the wires are permitted to expand, and the O-ring 62 moves the reflective member 20 back towards the transparent member 28. Power to the SMA wires 60 may be controlled by a manually actuated switch 11 or by a sensor switch as described above.

The SMA wires 60 may be formed of a nickel/titanium alloy with low hysteresis, such as wires commercially available from Raychem Corporation, headquartered in Menlo Park, Calif., USA. Nickel/titanium wires manufactured and commercially available from Dynalloy, Inc. of Irvine, Calif., USA under the trademark Flexinol® may also be used.

The general properties and characteristics of shape memory alloy wires are well known to those skilled in the art. When heated through an alloy-specific temperature range, shape memory alloys undergo a phase transition from a martensitic phase to an austenitic phase in which the wire contracts to a memory position, applying a pulling force as it contracts to move the reflective member away from the transparent member. When current to the wires is switched off, the wires cool and can be easily stretched by leaf springs or the O-ring 62 moving the reflective member back toward the transparent member. The wires 60 should be constructed and arranged so that all undergo a linear translation of the same distance so that the reflective surface of the reflective member 20 is maintained parallel to the transparent member 28.

Figure 4:
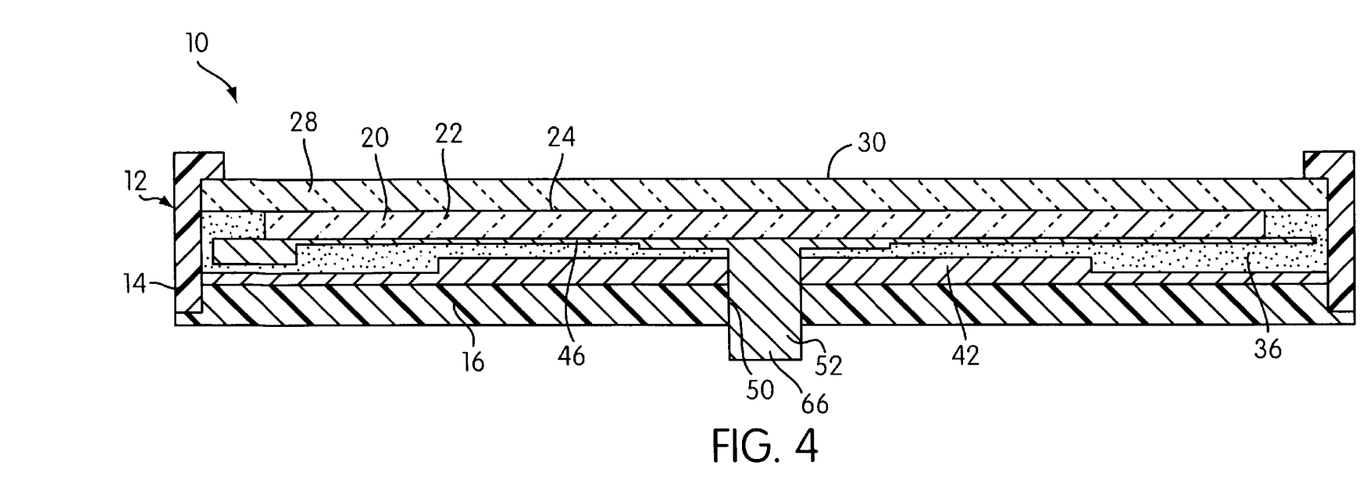
FIG. 4 is a schematic cross-sectional view similar to that in FIG. 2, but illustrating a second embodiment of the present invention.

As an alternate embodiment, as illustrated in FIG. 4, the controlling mechanism may be a manually engageable member 66 which is fixed to the reflective member 20 and extends rearwardly through the back wall 16 to be manually engaged. In such an embodiment, the manually engageable member extends through the back wall 16 in sliding sealed engagement to prevent any fluid constituting the light reducing medium 36 from escaping from the housing 12. The manually engageable portion 66 can be moved inwardly and outwardly to alter the gap between the reflective member 20 and transparent member 28 and thus control the amount of light reducing medium 36 therebetween. The sliding friction engagement between the manually engageable member and the housing back wall 16 retains the reflective member 20 in the position into which it is moved. In such an embodiment, no springs or biasing members are provided.

It should also be appreciated that the present invention contemplates that an infinite number of adjustments to the gap between the transparent member 28 and the reflective member 20 can be provided. While in the first embodiment utilizing the solenoid coil for the controlling mechanism, as illustrated in FIGS. 2 and 3, there may be only a nondimming and dimming position, it is contemplated that the gap G can be more precisely controlled. For example, the solenoid controlling assembly may use a material for the core of the solenoid that has a high magnetic permeability, but a low coercive force. Such material may comprise Permalloy, silicon steel, or a polymer mixed with a magnetic filler. With such material, the relationship between the magnetic field and the winding current should approach linearity. At a given current value, the return spring force should balance the magnetic attractive force, and the movable member (e.g., the reflective member) should remain at an intermediate equilibrium position. Thus, the volume of light reducing medium 36 between the transparent member and reflective member can be controlled by varying the current through the coil winding 44.

In addition, with the manually operated controlling mechanism described above, it is possible to manually position the reflective member 20 at various distances from the transparent member 28 to more precisely control the dimming effect of the mirror assembly 10 in comparison with the simple on/off controlling mechanism provided by the solenoid coil. As another example, a bi-directional stepping motor or rheostat (potentiometer) can be very precisely controlled to move the reflective member 20 to provide infinite degree of adjustment, or selected intervals of adjustment, of the gap between the reflective member 20 and transparent member 28.

Figure 6:
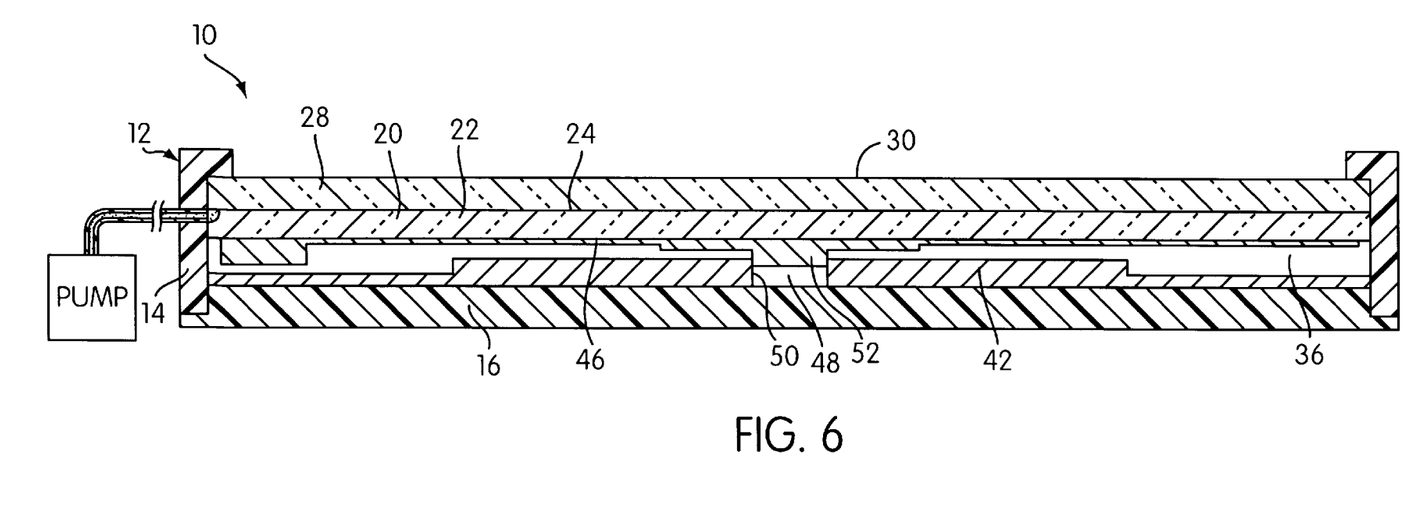
FIG. 6 is a schematic cross-sectional view similar to that in FIG. 2, but illustrating a fourth embodiment of the present invention.

As a further alternative, as illustrated in FIG. 6, the controlling mechanism may be in the form of a peristatic pump 70 or electric pump which communicates with the gap G between the reflective member 20 and transparent member 28. In this embodiment, the light reducing medium 36 comprises fluid which can be disposed between the reflective member 20 and transparent member 28. However, no light reducing medium is disposed in the space 37 between the reflective member 20 and the back wall 16. Rather, to effect dimming, the pump 70 will pump the light reducing medium 36 between the reflective member 20 and the transparent member 28 so as to force the reflective member to move rearwardly away from the transparent member 28 to effect dimming. As shown, the light reflective member is provided with a recess 74 to ensure that the fluid discharged by pump 70 will be received between the reflective member 20 and transparent member 28. When no dimming is to occur, the pump sucks or evacuates the light reducing medium fluid from the gap between the transparent member 28 and the reflective member 20. The evacuation of the light reducing fluid 36 causes the reflective member 20 to be drawn towards and into contact with the transparent member 28.

Figure 7:
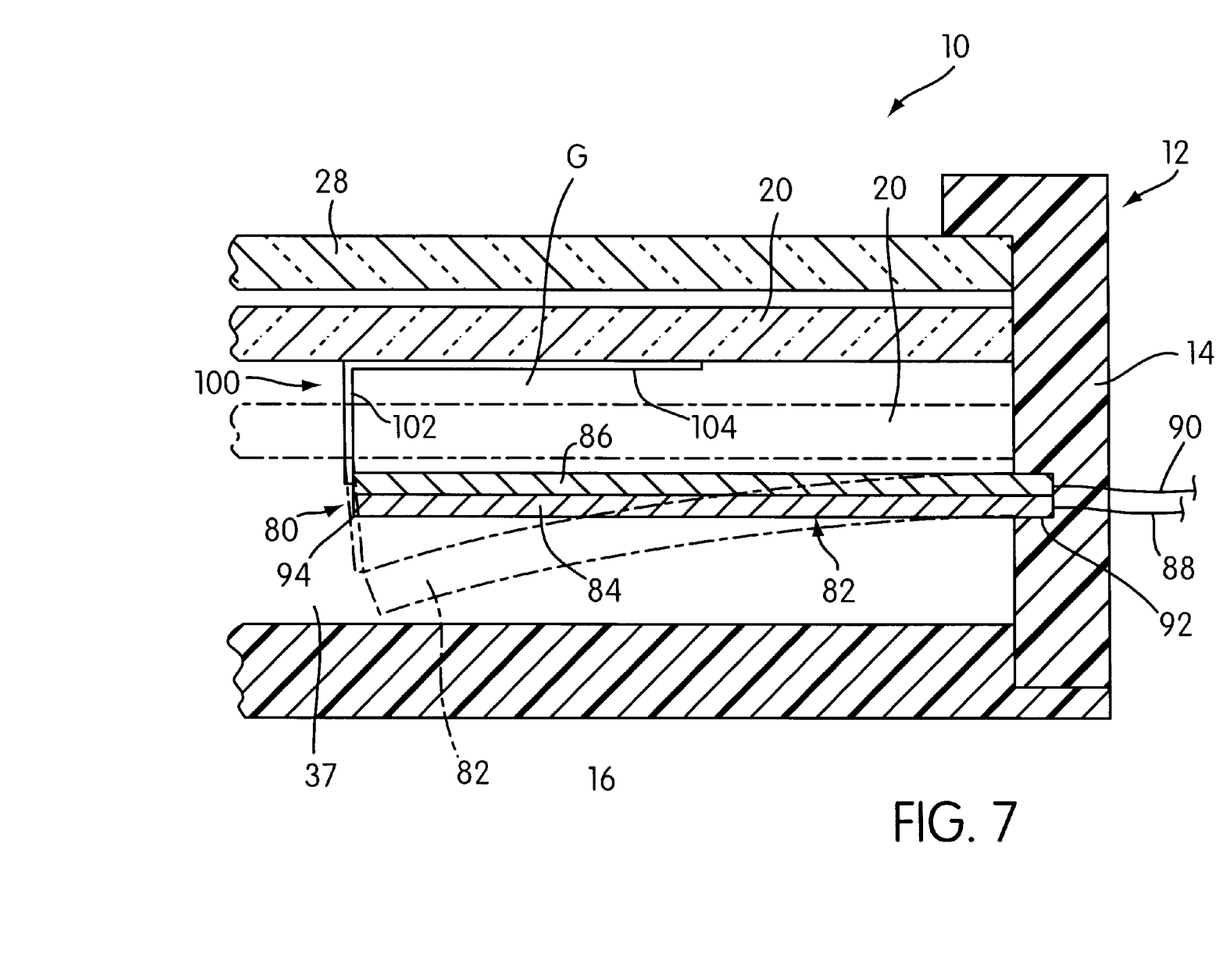
FIG. 7 is a schematic cross-sectional view similar to that in FIG. 2, but illustrating a fifth embodiment of the present invention.

Another alternate controlling mechanism also comprises an actuating mechanism employing a deformable member for effecting relative movement between the reflective member 20 and the transparent member 28. As illustrated in FIG. 7, an actuating mechanism for the mirror assembly 10 includes a deformable member comprising a piezoelectric actuator 80 disposed within the space 37 between the reflective member 20 and the back wall 16 and operatively coupled to the reflective member 20 for effecting relative movement between the reflective member 20 and the back wall 16.

The general properties and characteristics of piezoelectric actuators are known. In the illustrated embodiment, the actuator 80 comprises a wafer laminate 82 of two independent piezoelectric elements 84, 86 stacked together. Each element 84 and 86 is separately wired by wires 88 and 90, respectively. The elements 84, 86 are driven with a driving voltage in opposite directions so that one of the elements 84 or 86 expands and the other element 84 or 86 contracts.

Accordingly, the wafer laminate 82 bends when a driving voltage is applied to both elements 84, 86 simultaneously.

Such linear actuators, commonly known as "bimorphs," are commercially available from companies such as Active Control Experts (ACX) of Cambridge, Mass.

One end 92 of the wafer laminate 82 is secured in cantilever fashion to the peripheral wall 14 of the housing 12 (or is otherwise fixed with respect to the housing 12), and the opposite end 94 of the wafer element 82 is secured to the back of the reflective member 20. Thus, when a driving voltage is applied to the wafer element 82, thereby causing it to deform by bending, as shown in phantom in FIG. 7, relative movement between the reflective member 20 and the transparent member 28 is effected. When the driving voltage is cut off, the wafer laminate 82 returns to its undeformed condition. A biasing structure, such as leaf springs or an O-ring (not shown), may be provided to bias the reflective member 20 toward the transparent member 28. As an alternative to leaf springs or an O-ring, the elasticity of the actuator itself may bias the reflective member 20 toward the transparent member 28. Power to the wafer laminate 82 may be controlled by a manually actuated switch or by a sensor switch as described above.

In the illustrated embodiment, the reflective member 20 is in close proximity to the transparent member 28 when the wafer laminate 82 is undeflected, so as to effect little or no dimming. The reflective member 20 is moved away from the transparent member 28 when wafer laminate 82 deflects upon application of a voltage thereto. It can be appreciated that the piezoelectric actuator 80 could be configured so that the reflective member 20 is spaced from the transparent member 28 when the wafer laminate 82 is undeflected, and the reflective member 20 moves toward the transparent member 28 when wafer laminate 82 deflects upon application of a voltage thereto.

In the preferred embodiment, the end 94 of the wafer laminate 82 is attached to the back of the reflective member 20 by means of a wire clip 100 which comprises a first portion 104 adhered to the back of the reflective member 20, and a second portion 102 which extends away from the back surface of the reflective member 20 and is connected to the end 94 of the wafer laminate 82.

In an alternate configuration for the piezoelectric actuator, the wafer laminate may have a length that spans the width of the housing 12. Opposite ends of the wafer laminate can be secured to the peripheral wall 14 of the housing 12, and a middle portion of the wafer laminate can be attached to the back of the reflective member 20. Alternatively, the opposite ends of the wafer laminate can be secured to the back of the reflective member 20 and a middle portion of the laminate can be attached to the back wall 16 of the housing 12. In either case, it can be appreciated that bending of the wafer laminate due to the application of a voltage thereto will effect relative movement between the reflective member 20 and the transparent member 28.

In addition, while in the preferred embodiment shown in FIG. 7 only a single actuator is provided so as to limit cost and complexity of the assembly, two or more actuators acting in parallel or series may be used.

Piezoelectric actuators used by the inventor require 200 volts DC at low power to achieve full actuation. Accordingly, a piezoelectric actuator would include driving circuitry for converting a vehicle's 12 volt supply to a 200 volt, low current supply for the actuator. It is presently contemplated that such driving circuitry could be provided as a circuit board that is attached to or built integrally into the wafer laminate.

Piezoelectric actuators provide certain advantages over other types of actuators. Typically, piezoelectric actuators are less temperature sensitive, require less power, and have quicker response time than other powered actuator mechanisms.

The present invention further contemplates that the reflective member 20 can be stationary, and that transparent member 28 would move towards the reflective member 20 to avoid the dimming effect, and move away from the reflective member 20 to create the dimming effect. This can be accomplished with any of the controlling mechanisms mentioned above.

With respect to the light reducing medium 36, it is preferred to use an antifreeze fluid so that it does not freeze in cold weather temperatures. It is desired for the fluid to maintain a substantially constant viscosity independent of temperature. The fluid should remain at a relatively low viscosity to permit easy and quick deployment. In addition, the fluid is also preferably self wetting to glass to cover the entire glass surfaces and completely fill the gap between the reflective member 20 and the transparent member 28. It also should be noted that the darkness of the fluid will determine how thick of a gap between the transparent member 28 and the reflective member 20 is to be provided. For a darker fluid, a thinner gap would be used, and for a lighter fluid, a larger gap would be required. It should be appreciated, however, that it is desirable to make the gap between the transparent member 28 and reflective member 20 as thin as possible to achieve the required dimming condition in order to reduce the deployment time and also to make the total thickness of the mirror assembly thinner.

In an alternative embodiment (not shown) it is contemplated that the light reducing medium be in the form of a solid, such as a relatively fine, transparent, sponge foam material. In such an embodiment, when the foam material is compressed, it becomes less transmissive to provide a dimming effect. Thus, in this embodiment, the gap between the transparent member 28 and the reflective member 20 is reduced to effect dimming and is increased to effect increased transmissivity.

With respect to the transparent member 28, it is desired for the transparent member 28 to be as thin as possible in order to reduce any refraction of light caused thereby. By providing a thin glass material for the transparent member 28, less refraction, and thus greater reflection of light will be provided. In addition, because less refraction will occur, the possibility of a "double image" reflection will be reduced or avoided. In this regard, by providing a thinner gap between the reflective member 20 and transparent member 28 will also reduce any refractive effect during the dimming condition. Thus, it is desirable for the light reducing medium 36 to be dark or highly reactive so as to create a large change in light transmission with a minimum gap between the transparent member 28 and the reflective member 20. Again, this will make the mirror assembly 10 thinner as a whole, and reduce any "double image" effect. It should also be noted that it may be desirable to provide an antireflective coating on the front exterior surface 30 of the transparent member to further reduce any double image effect.

Besides the improved operation, simplicity of manufacture and increased cost-effectiveness of the present invention, a further advantage of the arrangement illustrated in FIGS. 2 and 3 is that, in the event of a power failure of the mirror system, there will be no current input through coil winding 44. As a result, in any sort of power failure with the mirror assembly 10, the mirror assembly 10 will automatically default to its non-dimming condition by operation of the leaf springs 56, or other biasing means.

It should be appreciated that rather than using the leaf springs 56 of FIGS. 2 and 3, or the soft O-ring of the tubular type having air contained therein, as shown in FIG. 5, a ring of closed cell foam which can withstand a liquid environment can be used. Such an O-ring or ring of resilient material can be positioned in an annular fashion within the gap between the solenoid backing 42 and the solenoid front 46 so as to apply an even and concentric load with respect to the reflective member so as to ensure that the reflective member 20 remains parallel with the transparent member 28 at all time. It is also desirable that the bearing surfaces between the reflective member and the housing be relatively evenly distributed and broad based so as to retain the parallel relationship between the transparent member 28 and the reflective member 20.

As mentioned above, the controlling mechanisms described herein can be used in both an interior, center mount mirror and an exterior, side mount mirror. Moreover, a powered dimming mechanism provided in the exterior, side-mounted mirror assembly 4 can also be activated by means of the switch 11 mounted to the interior center mounted mirror. Accordingly, dimming mechanisms in both the interior mirror 10 and exterior mirrors 4 can be activated by means of the single switch 11.

An alternative arrangement is to employ a conventional prism mirror as the interior, center mounted rear view mirror and a powered control mechanism in the exterior, side mounted mirrors. The activating switch for the powered control mechanism is coupled to the switch lever of the interior mirror, and the activating switch is constructed and arranged so that the control mechanism of the exterior mirror is activated to thereby dim the side mirror when the center mirror lever switch is moved to the night time position, and the control mechanism is deactivated to thereby return the side mirror to normal reflection when the center mirror lever switch is moved to the daytime position.

The dimming mirror assembly of the present invention, provided in either the interior center or the exterior side mirrors, can be provided as original equipment in a vehicle or as an after market upgrade product. As an after market upgrade, the assembly can be provided as a complete replacement mirror assembly with a switch mechanism and appropriate wiring for connecting the assembly to the vehicle's power source. Alternatively, the dimming mirror may be provided as a dimming panel unit comprising a transparent member and a reflective member mounted in a housing for relative movement, a control mechanism contained within the housing for effecting the relative movement, and a light reducing medium also contained within the housing. Appropriate wiring and switches are provided with the dimming panel unit. The panel unit may be secured, such as by adhesive pads or the like, to the glass surface of the existing mirror assembly. For exterior side mirrors in particular, the existing mirror glass and panel backing can be removed from the mirror assembly, and the dimming panel unit can be operatively connected to the motor actuator or remote control mechanism of the existing mirror assembly. The side mirror after market upgrade would include, in addition to the dimming panel unit, wiring for connecting the unit to the vehicle's power source and a switch to be attached to the interior center mirror assembly and operatively coupled to the prism mirror switch lever as described above.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

What is claimed is:

1. A dimming mirror assembly for a vehicle comprising:
   a housing constructed and arranged to be mounted on a vehicle,
   a reflective member and a cooperating transparent member together defining a mirror within said housing; said reflective and transparent members mounted in said housing in juxtaposition with respect to one another for relative movement towards and away from one another to define a gap of variable size between said reflective and transparent members;
   a light reducing medium disposed within said gap;
   an actuating mechanism including a deformable member formed from an electrically deformable material adapted to deform in response to an application of voltage thereto, said deformable member having a portion thereof engaging at least one of said transparent and reflective members and another portion thereof engaging a fixed surface within said housing such that upon application of voltage to said electrically deformable material thereof said deformable member deforms to effect relative motion between said reflective and transparent members to vary the size of the gap therebetween and responsively vary an amount of light reducing medium disposed within said gap, and
   a voltage regulating mechanism communicated to said actuating mechanism, said voltage regulating mechanism being adapted to regulate the voltage applied to said electrically deformable material to thereby control the size of the gap between said reflective and transparent members and the amount of light reducing medium disposed within said gap.

2. The dimming mirror assembly of claim 1, wherein said transparent member is constructed and arranged to cooperate with said housing to define a sealed enclosure for containing a fluid which comprises said light reducing medium.

3. The dimming mirror assembly of claim 1, wherein said reflective member comprises mirror glass having a reflective coating.

4. The dimming mirror assembly of claim 1, wherein said light reducing medium comprises a fluid including at least one alcohol or polyol selected from the group consisting of polyethyleneglycol, polypropyleneglycol, and butanal.

5. The dimming mirror assembly of claim 4, wherein said fluid of said light reducing medium further includes indigo dye which acts as a filter that transmits only blue wavelength light therethrough.

6. The dimming mirror assembly of claim 1, further comprising biasing structure constructed and arranged such that the relative motion between said reflective and transparent members resulting from the application of voltage to said deformable member increasingly stresses said biasing structure so that upon a decrease or removal of the voltage applied to said deformable member said biasing structure applies a biasing force that effects an opposite relative motion between said transparent and reflective members.

7. The dimming mirror assembly of claim 6, wherein voltage regulating mechanism comprises a manually operable switch.

8. The dimming mirror assembly of claim 7, wherein said deformable member comprises a shape memory allow wire.

9. The dimming mirror assembly of claim 7, wherein said deformable member comprises a plurality of shape memory alloy wires.

10. The dimming mirror assembly of claim 7, wherein said deformable member comprises a piezoelectric actuator.

11. The dimming mirror assembly of claim 10, wherein:
   said piezoelectric actuator includes a laminate disposed between a pair of piezoelectric elements;
   one portion of said laminate is fixed with respect to said housing and another portion of said laminate is attached to one of said reflective and transparent member such that bending of said laminate affects said relative motion between said reflective and transparent members;
   said voltage regulating mechanism applies respective opposite voltages to said piezoelectric elements to expand one of said elements and contract the other of said elements to thereby bend said laminate to affect said relative motion.

12. The dimming mirror assembly of claim 11, wherein said one portion of said laminate is one end portion of said laminate which is attached in cantilever fashion to said housing and said another portion of said laminate is an opposite end portion of said laminate which is attached to said reflective member.

13. The dimming mirror assembly of claim 11, wherein said one portion of said laminate is a middle portion of said laminate which is attached to said housing and said another portion of said laminate includes a pair of opposite end portions of said laminate each of which are attached to said reflective member.

14. The dimming mirror assembly of claim 7, wherein said mirror assembly constitutes an interior, center mounted rear-view mirror of a vehicle.

15. The dimming mirror assembly of claim 7, wherein said mirror assembly constitutes an exterior, side mounted rear-view mirror of a vehicle.

16. The dimming mirror assembly of claim 15, wherein said voltage regulator mechanism is coupled to a dimming switch of an interior mirror for responsively dimming said exterior side mounted rear-view mirror upon dimming said interior mirror.

17. The dimming mirror assembly of claim 6, wherein said deformable member and said biasing structure are positioned such that said relative motion effected by the application of voltage to said deformable member is said reflective and transparent members moving apart from one another towards a maximum gap position and said opposite relative motion effected by said biasing structure is said reflective and transparent member moving towards one another towards a minimum gap position.

18. The dimming mirror assembly of claim 6, wherein said biasing structure engages said reflective member and is constructed and arranged to apply said biasing force to said reflective member to move said reflective member relative to said transparent member to affect said opposite relative motion.

19. The dimming mirror assembly of claim 18, wherein said biasing structure engages said reflective member and is constructed and arranged to apply said biasing force to said reflective member to move said reflective member relative to said transparent member to affect said opposite relative motion.

20. The dimming mirror assembly of claim 6, wherein said biasing structure includes a leaf spring.

21. The dimming mirror assembly of claim 6, wherein said biasing structure includes an air-filled O-ring.

22. The dimming mirror assembly of claim 6, wherein said biasing structure includes an O-ring of resilient material.

23. The dimming mirror assembly of claim 22, wherein said resilient material is closed cell foam.

24. The dimming mirror assembly of claim 1, wherein said housing has a surface contoured for mounting said housing on a mirror glass.

25. The dimming mirror assembly of claim 1, wherein said transparent member is fixed with respect to said housing and said reflective member is permitted to be movable relative to said transparent member.

26. The dimming mirror assembly of claim 1, wherein said deformable member comprises one or more shape memory alloy wires.

27. The dimming mirror assembly of claim 26, wherein said shape memory alloy wire is a formed from a nickel/titanium alloy.

28. The dimming mirror assembly according to claim 26, wherein said housing includes a housing reinforcement member (43) and said one or more shape memory alloy wires are fixed to said reinforcement member.

29. The dimming mirror assembly of claim 1, wherein said another portion of said deformable member is fixedly attached to said surface within said housing.

30. The dimming mirror assembly of claim 1, wherein said one portion of said deformable member is fixedly attached to said reflective member.

31. A dimming mirror assembly according to claim 1, further comprising a backing attached to said mirror, wherein said portion of said deformable member engaging at least one of said transparent and reflective members engages said reflective member through said backing.

32. A dimming mirror assembly according to claim 1, wherein said another portion of said deformable member directly engages said fixed surface within said housing.

33. A dimming mirror assembly according to claim 1, further comprising a clip attached to said mirror, wherein said portion of said deformable member engaging at least one of said transparent and reflective members engages said reflective member through said clip.

* * * * *